United States Patent
Hoskins

(10) Patent No.: US 12,331,841 B2
(45) Date of Patent: Jun. 17, 2025

(54) VALVE GUIDE WITH EXTERNAL RETURN SPRING FOR MUSICAL INSTRUMENT

(71) Applicant: Bajoc Music Enterprises, LLC, Portland, MI (US)

(72) Inventor: Jacob Hoskins, Portland, MI (US)

(73) Assignee: Bajoc Music Enterprises, LLC, Portland, MI (US)

( * ) Notice: Subject to any disclaimer, the term of this patent is extended or adjusted under 35 U.S.C. 154(b) by 318 days.

(21) Appl. No.: 18/298,112

(22) Filed: Apr. 10, 2023

(65) Prior Publication Data
US 2023/0332693 A1    Oct. 19, 2023

Related U.S. Application Data

(60) Provisional application No. 63/330,544, filed on Apr. 13, 2022.

(51) Int. Cl.
*F16K 3/24*     (2006.01)
*F16K 27/04*    (2006.01)
(Continued)

(52) U.S. Cl.
CPC .............. *F16K 3/24* (2013.01); *F16K 27/041* (2013.01); *G10D 7/10* (2013.01); *G10D 9/04* (2013.01)

(58) Field of Classification Search
CPC .......... F16K 3/24; F16K 3/262; F16K 27/041; G10D 9/04; G10D 9/00; G10D 7/00; G10D 7/10
(Continued)

(56) References Cited

U.S. PATENT DOCUMENTS 963,272 A * 7/1910 Blessing .................. G10D 9/04
                                               84/392
1,023,330 A * 4/1912 Reid ........................ G10D 9/04
                                               251/322
(Continued)

FOREIGN PATENT DOCUMENTS

FR        2477746 A1    9/1981
GB         216698 A     6/1924

OTHER PUBLICATIONS

East Coast Instruments, Bach TR300 Trumpet/Cornet piston guides, springs, spit valve corks kit, 3 pages, retrieved from https://www.eastcoastinstruments.com/shop/Trumpet-springs-s/bach-guides-springs-tr300.

(Continued)

*Primary Examiner* — Kelsey E Cary
(74) *Attorney, Agent, or Firm* — Endurance Law Group PLC

(57) ABSTRACT

A piston valve for a brass-wind musical instrument has spring barrel in which are formed opposing first and second keyways. A valve stem screws onto the top of the spring barrel. A loose key extends transversely through the first and second keyways. A bottom ring is slidably disposed around the spring barrel. The bottom ring has opposing notches. The loose key acts as a cross-bar supporting the bottom ring in its notches from underneath and enabling the bottom ring a degree of independent movement. A return spring is captured between the bottom ring and a top ring at the valve step/spring barrel interface. The loose key has a generally rectangular cross-section with first and second protruding ends fit within the respective first and second keyways. The first protruding end can have a major T-shaped head, whereas the second protruding end may have a minor t-shaped head.

20 Claims, 6 Drawing Sheets

(51) Int. Cl.
  *G10D 7/10*  (2006.01)
  *G10D 9/04*  (2020.01)
(58) Field of Classification Search
  USPC .......................... 84/388, 387 R, 380 R, 330
  See application file for complete search history.

(56) References Cited

U.S. PATENT DOCUMENTS

| | | |
|---|---|---|
| 1,055,445 A | 3/1913 | Conrad et al. |
| 1,922,685 A | 8/1933 | Johnson |
| 2,260,723 A | 10/1941 | Olds |
| 2,404,818 A | 7/1946 | Swinehart |
| 2,612,811 A | 10/1952 | Meyers |
| 2,798,401 A | 7/1957 | Miller |
| 3,030,846 A | 4/1962 | Greenleaf |
| 3,671,011 A | 6/1972 | Oguma |
| 2006/0219083 A1* | 10/2006 | Wasser .................. G10D 9/04 |
| | | 84/DIG. 1 |
| 2016/0267891 A1* | 9/2016 | Hagstrom ............... G10D 7/10 |

OTHER PUBLICATIONS

Tuoren, Trumpet Repair Kit, 7 pages, retrieved from https://www.amazon.com/TUOREN-Trumpet-include-Washers-Replacement/dp/B09QSHF49L/ref=sr_1_19?gclid=EAlalQobChMlqfWMILzy_AIVVh6tBh25bwDtEAMYASAAEgKjBfD_BwE&hvadid=241926987753&hvdev=c&hvlocphy=9052566&hvnetw=g&hvqmt=b&.

Whyharrelson, Alignment Tools & Springs, 2 pages, retrieved from https://www.whyharrelson.com/store/c36/Alignment_Tools_&_Springs.html.

* cited by examiner

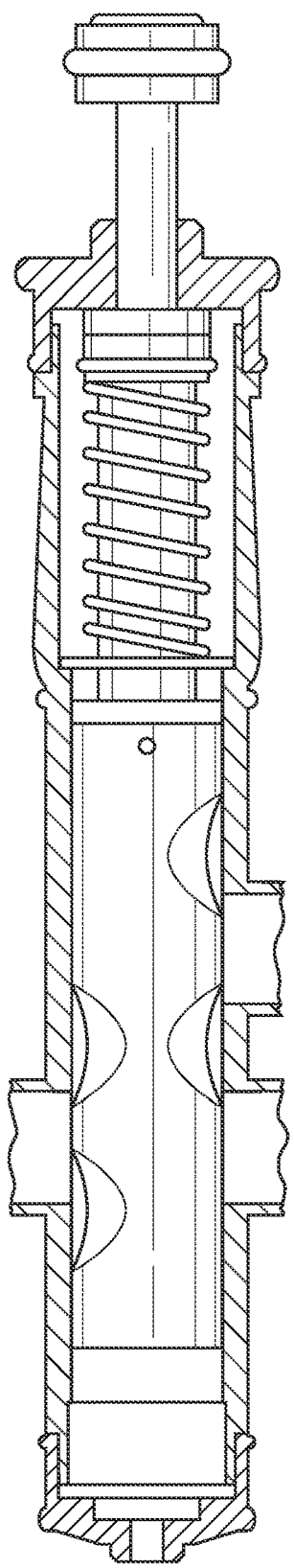
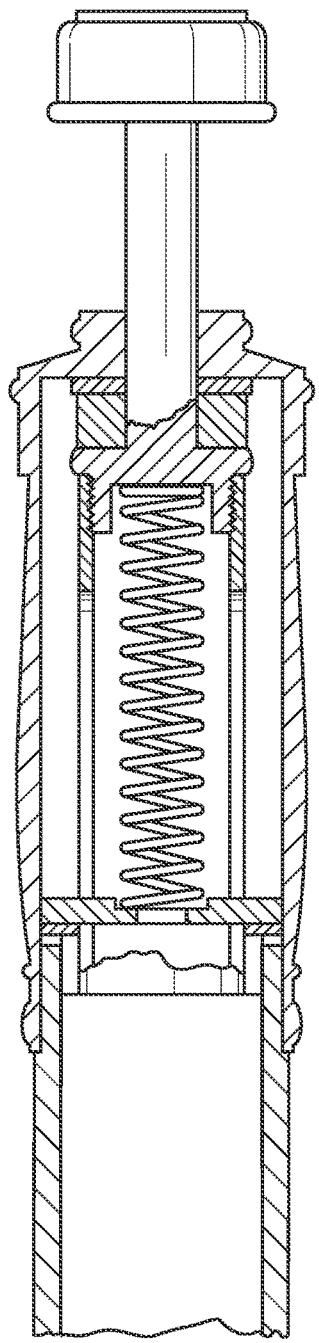
FIG. 1
(PRIOR ART)
FIG. 2
(PRIOR ART)

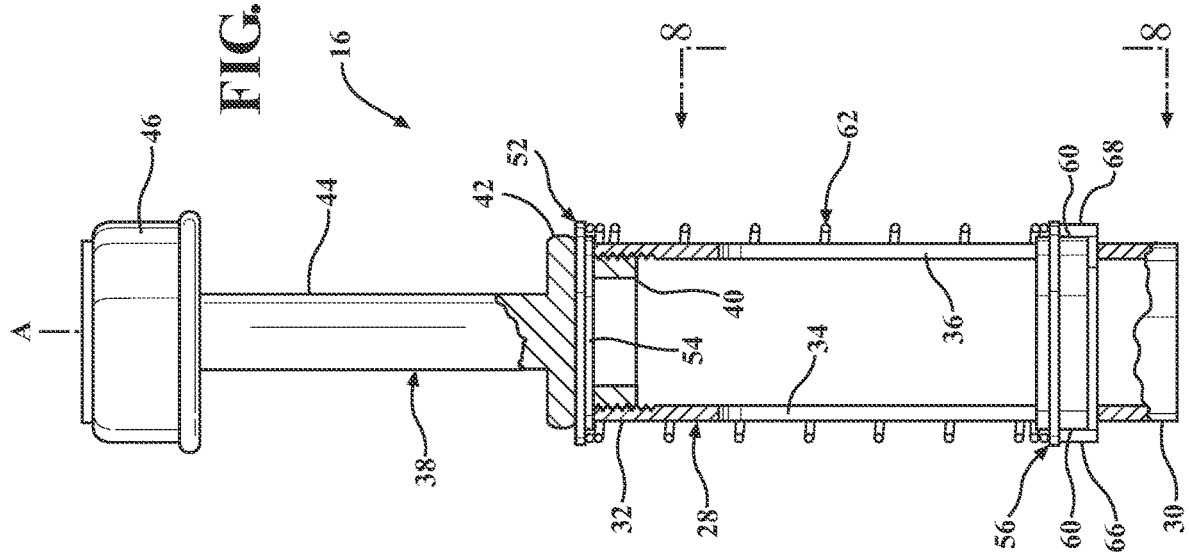
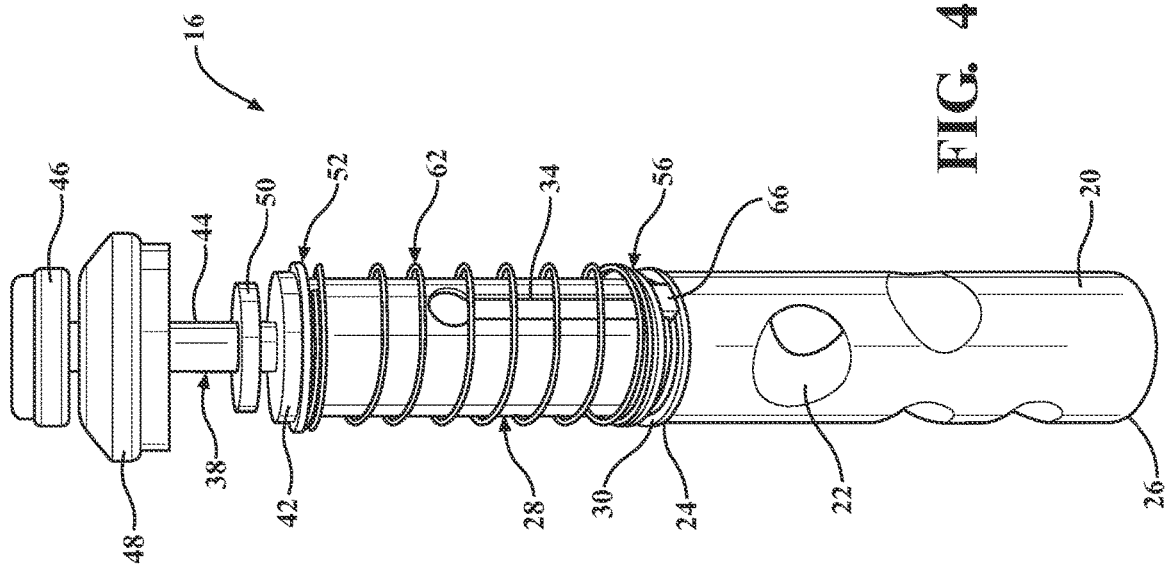

VALVE GUIDE WITH EXTERNAL RETURN SPRING FOR MUSICAL INSTRUMENT

CROSS REFERENCE TO RELATED APPLICATIONS

This application claims priority to Provisional Patent Application U.S. 63/330,544 filed on Apr. 13, 2022, the entire disclosure of which is hereby incorporated by reference and relied upon.

BACKGROUND OF THE INVENTION

Field of the Invention. The invention relates generally to a piston valve for a brass-wind musical instrument, and more particularly to an improved guide and return spring assembly therefor.

Description of Related Art Some brass-wind instruments utilize piston valves to manipulate the musical notes and tonal qualities produced in sound. Examples include trumpets, cornets, flugelhorns, tubas, euphoniums and mellophones. Such piston valves are typically actuated with a downward stroke by the player's finger and returned by the biasing effects of a return spring.

The smoothness and precision of actuation of a piston valve can affect a player's performance. Novice players may hardly notice a piston valve that drags, shifts or twists during actuation. However, accomplished players will notice a poorly guided piston valve. Ill effects caused by worn or poorly manufactured piston valves become evident during fast-paced sections of music where the piston valves may be actuated in rapid succession. Sometimes, tonal quality is affected. For this reason, highly skilled players of brass-wind instruments greatly value well-guided piston valves. That is to say, there is a strong commercial desire for piston valves that actuate with smooth precision in both descending and ascending directions.

Each piston valve includes an assembly of cooperating components arranged and fitted to allow for precise actuation and automatic return. One such component of the assembly is the return spring itself. Within a piston valve assembly, the return spring can be oriented in bottom-sprung or top sprung positions. A bottom-sprung valve has the return spring located below the valve body, i.e., the feature with airflow cross-ports. A top-sprung valve has the spring located above the valve body. Top-sprung valves are generally preferred by highly skilled players due, at least in part, to the propensity of internal springs to catch inside the spring barrel. In the case of top-sprung valves, the return spring is supported from buckling by a feature known as the spring barrel. In some designs, the return spring is located on the outside of the spring barrel as shown in the example of FIG. 1. In other designs, the return spring is located inside the spring barrel as shown in the example of FIG. 2. Many experts believe the external spring models (e.g., FIG. 1) provide better stability to the piston valve during its ascending and descending strokes, and thus is generally preferred over the internal spring models (FIG. 2). Despite this preference shared among the community of skilled musicians, a majority of modern brass-wind instruments are manufactured with internal springs (e.g., FIG. 2) due to lower manufacturing cost.

Another one of the components used to control the actuation of a piston valve is the valve guide. Both external and internal spring models rely on a washer-like valve guide to undergird the return spring, as shown in FIGS. 1 and 2. The common prior art valve guide is molded in mass-production from a plastic nylon material. This approach allows for valve guide production to be at a higher rate rather than being slowly cut by a slow but precision machining process. The downside of this is it can lead to tolerance issues of the valve guides due to the inaccuracies that develop from mold casting rather than precision machine cutting.

The valve guide is designed to slidably support the spring barrel and prevent rotation during actuation of the piston valve. It should be mentioned that each time a piston valve is actuated, the return spring tends to coil or uncoil thus imparting a torque at the ends. The valve guide can be compared to a bushing that manages the axial motion of the piston valve while restraining rotation of valve body. As can be observed in FIGS. 1 and 2, the valve guide seats in sockets in the valve casing wall. The sockets rotationally orient the valve body so that its airflow cross-ports will align properly with the fixed piping of the instrument. The valve guide includes an integrated cross-member that extends through axial keyways formed in opposing sides of the spring barrel. That is to say, as the piston valve descends and ascends without rotation during play, the valve guide remains seated in the sockets with the return spring pressing against the rigid cross-member.

A poorly manufactured valve guide will produce a piston valve that drags, shifts, or twists during actuation. To be sure, lower-quality valve guides that function adequately when new will tend to bind over time as the effects of wear and tear accumulate. Likewise, even a well-made valve guide will, if heavily used over time, begin to wear, and allow the piston valve to drag, shift or twist during actuation.

Previous technologies and approaches that enabled a smooth valve action can be found in instruments created by the French company F. Besson in the early 1900s, and by the American company F.E. Olds beginning in the 1930s. Both brands incorporated valve spring washers and return springs on the exterior part of the spring barrel. The bottom end of the coiled return spring would press against the valve spring washer while the upper end rested against the underside of the threaded valve stem base. The valve guide would either be constructed into a T-shaped piece that was carefully threaded onto the side of the piston, or from a small, square-rod stock piece that would attach securely and fixedly to the underside of the valve spring washer. Even though these old designs functioned reasonably well, certainly better than the current state of the art designs, they still suffered from actuation difficulties due to attrition over time. That is to say, the design of the piston valve would drag during actuation after a few years of heavy use.

There is therefore a need in the art for a piston valve for brass-wind instruments having piston valves that reliably actuate in a smooth and precise manner to enable production of high-quality music. Such a piston valve must be capable of sustaining smooth and precise actuation over time as parts wear. There is also a need in the art for component parts suitable to convert a modern internal spring piston valve to an external spring type piston valve enabling smooth actuation with automatic return.

BRIEF SUMMARY OF THE INVENTION

According to a first aspect of this invention, a piston valve for a brass-wind musical instrument comprises a generally cylindrical valve body has a top end and a bottom end. The valve body defines a central longitudinal axis along which reciprocating actuation of the piston valve occurs. A generally cylindrical spring barrel extends between a base and a neck. The base is in direct abutting contact with the top end of the valve body. First and second keyways are disposed in the spring barrel, diametrically opposing one another. Each keyway extends from the base axially toward respective terminal ends adjacent the neck. A valve stem extends axially from the neck of the spring barrel. A bottom ring is slidably disposed around the spring barrel. The bottom ring has an annular rim. A return spring disposed around the spring barrel. The return spring extends between upper and lower ends. The lower end is seated against the annular rim of the bottom ring. A loose key extends transversely through the first and second keyways of the spring barrel. The loose key being in direct contact with and selectively moveable relative to the annular rim of the bottom ring.

According to a second aspect of this invention, a guide and return spring conversion kit is provided for the piston valve of a brass-wind musical instrument. The conversion kit includes a top ring having an annular upper flange. The upper flange has an outer diameter and an inner diameter. A skirt extends downwardly from the upper flange. On its outside face, the skirt is set back from the outer diameter of the flange to form an outer relief. On its inside face, the skirt is set back from the inner diameter of the flange to form an inner relief. A bottom ring has an annular rim. The rim has an outer rim diameter and an inner rim diameter. An annular upper cuff extends upwardly from the rim adjacent the inner rim diameter. The outside face of the upper cuff is set back from the outer rim diameter to form an annular spring seat. A lower cuff extends downwardly from the rim of the bottom ring, adjacent the inner rim diameter. The outside face of the lower cuff set back from the outer rim diameter to form an annular ledge. The lower cuff includes a pair of notches disposed diametrically opposite one another. A return spring extends between upper and lower ends. The upper end is configured to seat against the outer relief of the top ring. The lower end is configured to seat against the spring seat of the bottom ring. A loose key is in direct contact with, and selectively moveable relative to, the annular rim of the bottom ring.

As mentioned, heavy use over time can cause the piston valve of a brass-wind instrument to shift and catch during actuation. Although the shifting action may be very small, it can have severely negative impact on a player's performance but for the accommodation of movement between the loose key and bottom ring enabled by the present invention. Because the loose key is not fixed to the bottom ring as in prior art designs, the bottom ring is effectively de-coupled so as to freely move with any shifting, tilting, and/or twisting motion of an externally oriented return spring. As a result, the piston valve is less likely to bind during actuation, even when played forcefully over long periods in service. That is to say, this invention allows the bottom ring to slightly but effectively shift and rock on the loose key as needed to maintain smooth working functionality of the piston valve.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 1 is a simplified cross-sectional view of a prior art external spring type piston valve assembly;

FIG. 2 is a fragmentary cross-sectional view of a prior art internal spring type piston valve assembly;

FIG. 4 is a perspective view of a fully assembled piston valve fitted with guide and return spring conversion kit components of FIG. 3;

FIG. 5 is a fragmentary view, in partial cross-section, of a piston valve fitted with guide and return spring conversion kit components of FIG. 3;

DETAILED DESCRIPTION OF THE INVENTION

Figure 3:
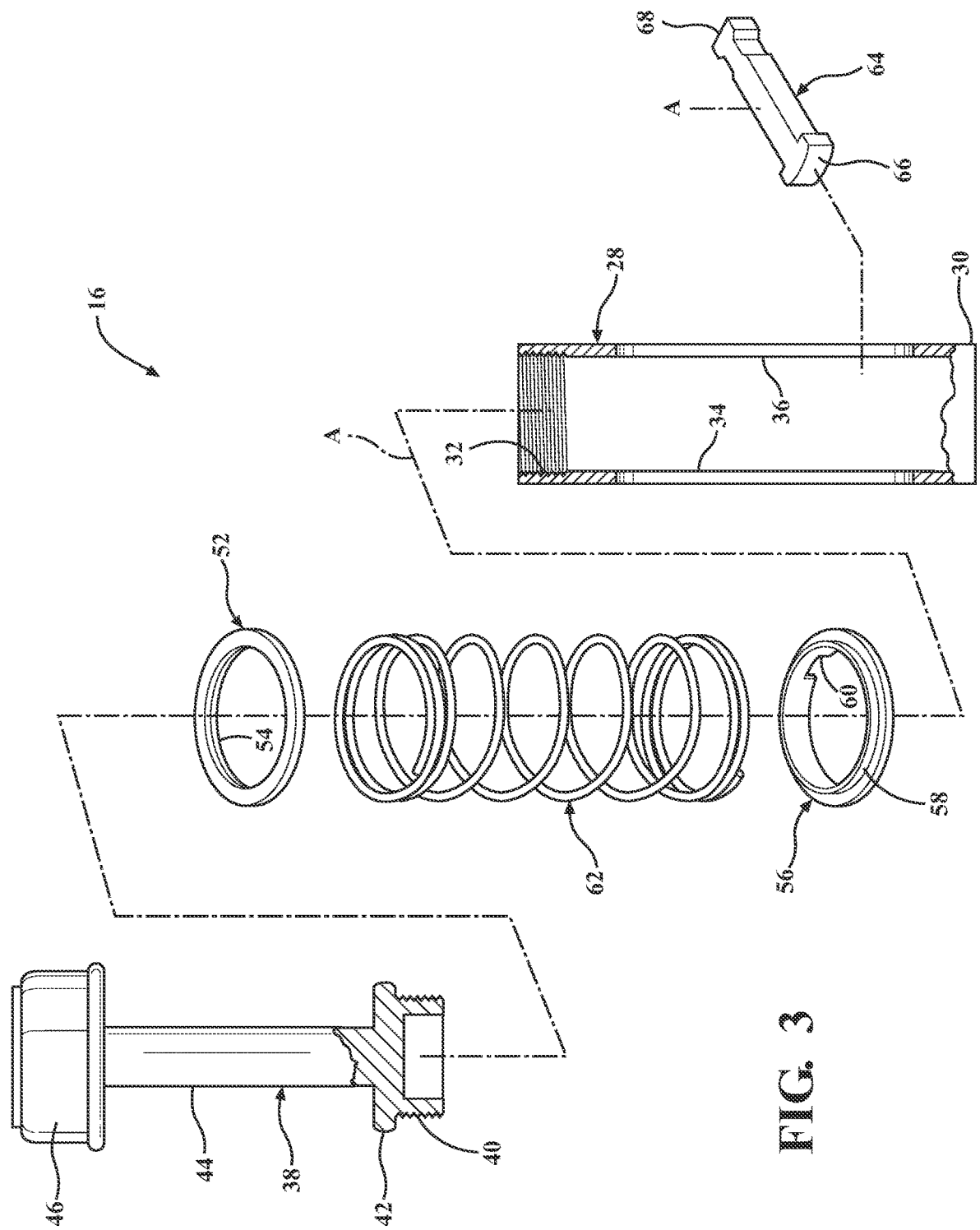
FIG. 3 is an exploded view showing a guide and return spring conversion kit for the piston valve of a brass-wind musical instrument according to an embodiment of the invention.

Referring to the figures, wherein like numerals indicate like or corresponding parts throughout the several views, a piston valve for a brass-wind musical instrument according to an embodiment of the invention is generally shown at 16 in FIGS. 3-9. The piston valve 16 is carried for reciprocating movement in a valve casing 18, which is a part of a brass-wind musical instrument configured with piston valves. Examples of suitably configured brass-wind instruments include, but are not limited to, trumpets, cornets, flugelhorns, tubas, euphoniums and mellophones.

The piston valve 16 has a generally cylindrical valve body 20. As perhaps best shown in FIG. 4, the valve body 20 is a shuttle-like feature having a look reminiscent of Swiss cheese with at least one transversely extending cross-port 22 for accommodating the passage of air though the instrument. The one or more cross-ports 22 variously align with the fixed piping depending whether the piston valve is actuated. The valve body 20 has a top end 24 and a bottom end 26. The valve body 20 has a generally constant body diameter defining a central longitudinal axis A along which reciprocating actuation of the piston valve 16 occurs.

Atop the valve body 20 is a spring barrel 28. The spring barrel 28 is generally cylindrical, being aligned with the valve body 20 along the longitudinal axis A. Typically, although not necessarily, the axial length of the spring barrel 28 is shorter than the axial lending of the valve body 20. The spring barrel 28 extends between a base 30 and a neck 32. The base 30 in direct abutting contact with the top end 24 of the valve body 20. That is to say, the base 30 is securely fixed to the top end 24 so that the valve body 20 and spring barrel 28 move in unison.

The spring barrel 28 has a barrel diameter that is slightly smaller than the body diameter of the valve body 20. The barrel diameter mentioned here is referring to the outer diameter of the spring barrel 28. Often, the difference in the diameters of the barrel and body are quite small, forming only a narrow ledge or transition at the junctures of base 30 and top end 24.

The spring barrel 28 has a hollow interior. The neck 32 of the spring barrel 28 may be internally threaded. For prior art internal spring type piston valve assemblies like that shown in FIG. 2, the hollow interior of the spring barrel is used to house the return string. However, as mentioned, many experts believe the internal spring models are inferior to the exterior spring models (FIG. 1). Thus, an application of the present invention is to enable conversion of an internal spring model valve assembly to the more preferred external spring type, and thereby enable transformation of a low cost piston valve into one that possesses all of the performance characteristics found in a professional grade instrument.

The spring barrel 28 is formed with first 34 and second 36 keyways, each extending from the base 30 (or from adjacent the base 30) axially upwardly toward respective terminal ends adjacent the neck 32. The second keyway 36 is disposed in the spring barrel 28 diametrically opposite the first keyway 34. Each terminal end of the first 34 and second 36 keyways has an enlarged circular crown. The first keyway 34 has a generally constant width, and likewise the second keyway 36 has a generally constant width. However, in at least some embodiments the width of the second keyway 36 is smaller than the width of the first keyway 34. The difference in widths is used to properly orient the piston valve in its valve casing so that air flows through the instrument correctly.

A valve stem 38 is a tower-like feature located on top of the spring barrel 28. The valve stem 38 is aligned with the spring barrel 28 and valve body 20 along the longitudinal axis A, and extends axially between opposite ends. A coupling 40 atone end of the valve stem 38 is configured to connect to the neck 32 of the spring barrel 28. In cases where the neck 32 of the spring barrel 28 is internally threaded, the coupling 40 can be formed with a threaded nipple to engage the internal threads in the neck 32 of the spring barrel 28. The coupling 40 may include a grip ring 42 disposed above the threaded nipple, as best seen in FIG. 3. The grip ring 42 has a knurled or reeded (i.e., ridged or grooved) outer edge and its grip ring diameter is slightly larger than the barrel diameter to facilitate the screw threading/unthreading process using a thumb and forefinger.

Figure 6:
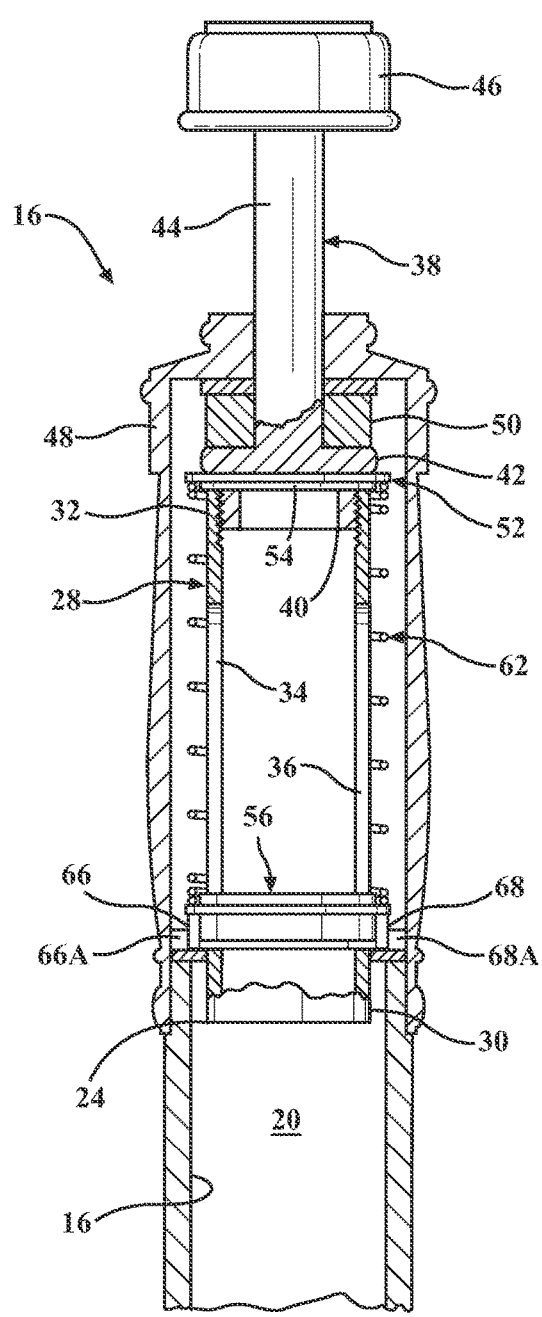
FIG. 6 is a fragmentary view, in partial cross-section, showing the piston valve of FIG. 5 operatively fitted inside the valve casing of a musical instrument, with the piston valve shown in the unactuated position.
Figure 7:
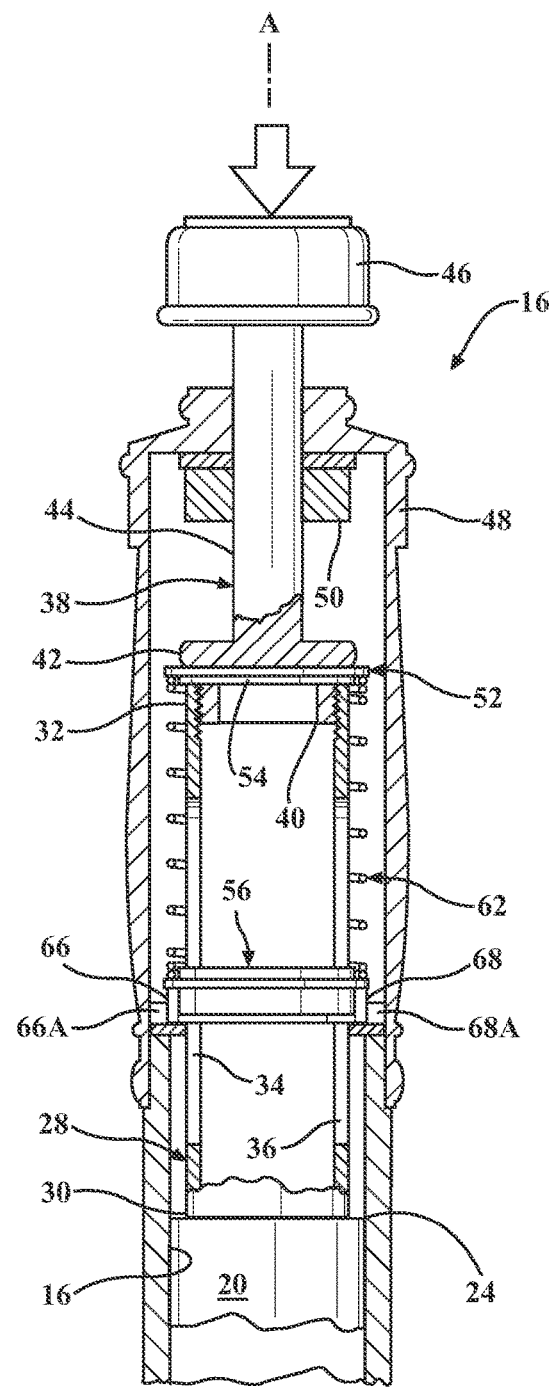
FIG. 7 is a view as in FIG. 6 but showing the piston valve in the actuated position.

An elongated shaft 44 extends axially upwardly from the coupling 40 and terminates at a finger pad 46. A musician depresses the finger pad 46 with the tip of their finger to actuate the piston valve 16 within its valve casing 18 during play. Loosely carried on the shaft 46 is an annular cap-like keeper 48, best seen in FIG. 4. The keeper 48 is slidably disposed on the shaft 46, and fitted with threads or another device to attach to the open top end of the valve casing 18. The keeper 48 thus acts like a screw cap to trap the piston valve 16 in the valve casing 18, enabling up-and-down sliding movement along the shaft 44. A bumper pad 50 may be disposed on the shaft 44 between the keeper 48 and the coupling 40, as shown in FIGS. 4, 6 and 7. The bumper pad 50 is typically made of felt or rubber and serves to cushion and silence the return-stroke of the piston valve 16. In some cases, bumper pad 50 may be attached to the underside of the keeper 48 and/or the top of the keeper 48 may be fitted with a thin rubber washer to cushion the downstroke of the piston valve 16. Many variations are possible.

Figure 12:
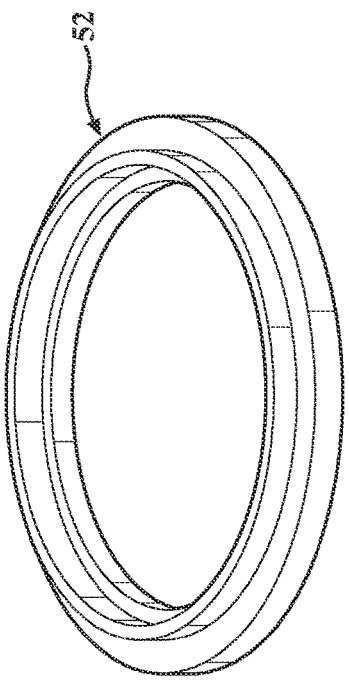
FIG. 12 is an upside-down perspective view of the top ring.

Turning to FIGS. 3-5, the assembly of cooperating components arranged and fitted to allow for precise actuation and automatic return of the piston valve 16 will be described. A top ring 52 is captured between the valve stem 38 and the spring barrel 28. More specifically, the washer-like top ring 52 is sandwiched between the coupling 40 and the neck 32. Perspective views of the top ring 52 appear in FIGS. 3 and 12. From these, it can be seen that the top ring 52 has an annular upper flange. The upper flange defines an outer diameter and an inner diameter of the top ring 52. The outer diameter of the upper flange is greater than the barrel diameter, i.e., the outside diameter of the spring barrel 28, so that an overhang is formed. However, the inner diameter is smaller than the barrel diameter so that the top ring 52 is incapable of slipping into the hollow interior of the spring barrel 28. In this way, the top ring 52 sets on the uppermost edge of the neck 32 of the spring barrel 28.

The top ring 52 has a skirt 54 that extends downwardly a short distance from the upper flange. On its outwardly facing side, the skirt 54 is set back from the outer diameter of the upper flange to form an outer relief, the purpose of which will be explained. On its inwardly facing side, the skirt 54 is set back from the inner diameter of the flange to form an inner relief. These inner and outer reliefs are best seen in the upside-down perspective view of FIG. 12. The inner relief is configured to overlie the neck 32 of the spring barrel 28. The inner relief has a diameter larger than the barrel diameter, thus providing a self-centering function that helps retain the top ring 52 in position during use. The inner relief is compressed when the coupling 40 of the valve stem 38 is screwed into the neck 32 of the spring barrel 28.

The assembly of cooperating components arranged and fitted to allow for precise actuation and automatic return of the piston valve 16 also includes a bottom ring 56. Unlike the top ring 52 which is immovably locked in place on the top of the spring barrel 28, the bottom ring 56 is slidably disposed around the spring barrel 28. That is to say, the sleeve-like bottom ring 56 encircles the spring barrel 28 and can freely slide between the base 30 and neck 32.

Figure 11:
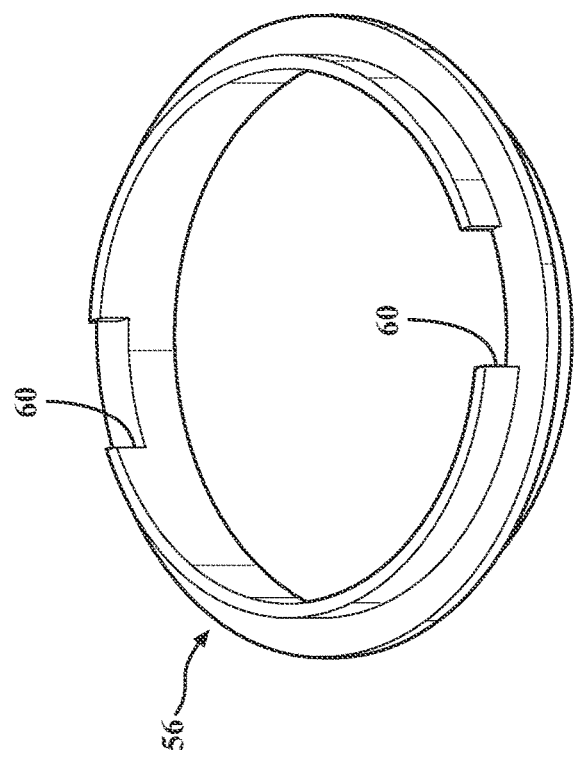
FIG. 11 is an upside-down perspective view of the bottom ring.

Perspective views of the bottom ring 56 are provided in FIGS. 3 and 11. From these, it can be observed that the bottom ring 56 has an annular rim that defines an outer rim diameter and an inner rim diameter. The outer rim diameter is typically about equal to the outer diameter of the top ring 52, and both are smaller than the inside diameter of the valve casing 18 in the region of the spring barrel 28 so that the piston valve 16 can freely move up and down within the valve casing 18 as depicted in FIGS. 6 and 7.

Considering still the design features of the bottom ring 56, an annular upper cuff 58 extends upwardly from the rim adjacent the inner rim diameter. The upper cuff 58 set back from the outer rim diameter to form an annular spring seat, as will be described more fully. The diameters of the upper cuff 58 may be approximately equal to the inside and outside diameters of the top ring skirt 54. Opposite the upper cuff 58, a lower cuff extends downwardly from the bottom ring rim. The annular insides of the upper 58 and lower cuffs combined with the inner rim diameter for a smooth bushing-like running surface for the bottom ring 56 as it rides against the spring barrel 28. The lower cuff is also set back from the outer rim diameter to form an annular ledge. The lower cuff includes a pair of notches 60 disposed diametrically opposite one another. Each notch 60 of the lower cuff has a width that is generally equal to the width of the first keyway 34. The purpose of the notches 60 will be described.

The assembly of cooperating components that allow for precise actuation and automatic return of the piston valve 16 further includes a return spring 62. The return spring 62 is disposed around the spring barrel 28 in turns or coils typical of a wire-formed compression spring. Suitable results have been obtained with coiled return springs 62 formed from a phosphor-bronze material. The return spring 62 extends between upper and lower ends, having a length designed to be held in constant compression between the top 52 and bottom 56 rings, and spring rate matched to the application. The upper end of the return spring 62 seats against the outer relief of the top ring 52, whereas the lower end of the spring 62 is seated against the spring seat in the bottom ring 56. In this manner, the return spring 62 is held in position and pushes with more-or-less equal opposing forces against the top 52 and bottom 56 rings and the piston valve 16 is actuated.

The assembly of cooperating components that allow for precise actuation and automatic return of the piston valve 16 includes a loose key 64. The loose key 64 extends transversely through the first 34 and second 36 keyways of the spring barrel 28, as illustrated in FIGS. 5-7. The loose key 64 is in direct contact with, and is selectively moveable relative to, the bottom ring 56. To reiterate, the loose key 64 is not rigidly connected to the bottom ring 56.

Figure 10:
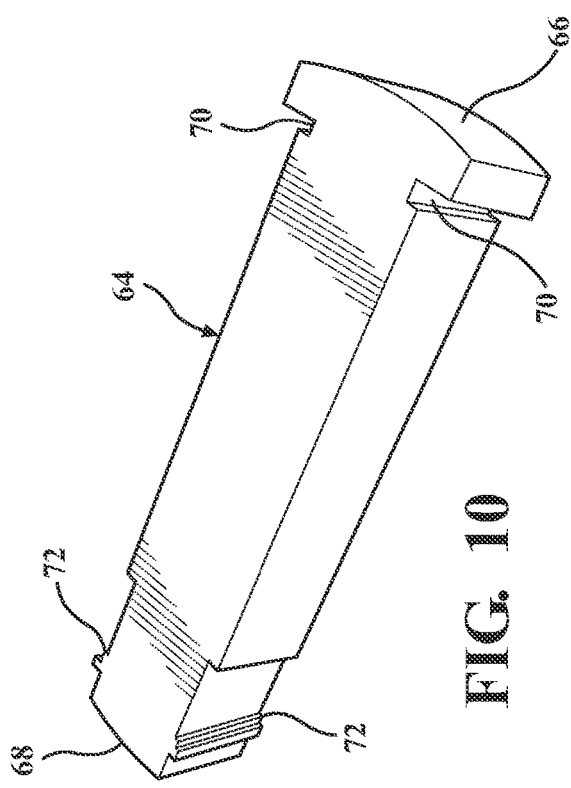
FIG. 10 is a perspective view of the loose key according to an embodiment of the present invention.

An enlarged perspective view of the loose key 64 appears in FIG. 10. Here, the loose key 64 can be seen having a first protruding end 66 and a second protruding end 68. When assembled with the piston valve 16, the first protruding end 66 is in registry with the first keyway 34 and a second protruding end 68 is in registry with the second keyway 36. Thus, the width of the first protruding end 66 is sized for sliding fit inside the first keyway 34, and likewise the width of the second protruding end 68 is sized for sliding fit up and down in the second keyway 36. The first 66 and second 68 protruding ends are adapted to loosely nest within the notches 60 of the bottom ring 56. That is to say, when assembled with the piston valve 16, the notches 60 of the bottom ring 56 straddle the respective first 66 and second 68 protruding ends of the loose key 64.

Considering still the design features of the loose key 64, its overall length is preferably equal to or slightly greater than the diameter of the bottom ring 56, such that each end 66, 68 is either about even with or slightly overhanging the outer rim diameter. Notwithstanding, the overall length of the loose key is sized to fit within respective sockets 66A, 68A in the wall of the valve casing 18, as shown in FIGS. 6 and 7. The sockets 66A, 68A in the wall of the valve casing 18 rotationally orient the valve body 20 so that its airflow cross-ports 22 will align properly with the fixed piping of the instrument as is common in the industry.

The loose key 64 is bar-like, having a generally rectangular cross-section as can be observed in FIG. 10. Notwithstanding, the final design of the loose key 64 could take various forms provided the first 66 and second 68 protruding ends fit within their respective first 34 and second 36 keyways and properly seat in the respective sockets 66A, 68A in the wall of the valve casing 18.

The first protruding end 66 of the loose key 64 may have a major T-shaped head. The major T-shaped head is shown having a major width that is greater than the width of the first keyway 34. The distal end of the major T-shaped head is dimensioned to seat in the socket 66A. Undercuts, or small reliefs, 70 behind the T-shaped head are dimensioned to accommodate the notch 60 of the bottom ring 56, which is clearly visible in upside-down view of FIG. 11. The edges of its lower cuff nest freely in the reliefs 70 to stabilize the bottom ring 56 as it rests upon the loose key 64.

The second protruding end 68 may be formed with a minor t-shaped head. The minor t-shaped head has a minor width that is greater than the width of the second keyway 36. The distal end of the minor t-shaped head is dimensioned to seat in the socket 68A. The small protruding ribs that form the head of the "t" (appearing on the lefthand side of FIG. 10) are slightly wider than the notch 60 of the bottom ring 56 and of the second keyway 68A. Shoulders 72, like the reliefs 70, are dimensioned to accommodate the notch 60 of the bottom ring 56. The shoulders 72 are visible in FIG. 10. The edges of the lower cuff nest freely in the shoulders 72 to stabilize the bottom ring 56 as it rests upon the loose key 64. When assembled with the piston valve 16, the ribs that form the head of the "t" are trapped between the spring barrel 28 the bottom ring 56, acting as a spacer and sliding interface. In this manner, both the major T-shaped and the minor t-shaped heads prevent the loose key 64 from shifting transversely relative to the spring barrel 28 while it slides (relatively) up- and down in the keyways 34, 36. Meanwhile, the loose key 64 acts as a cross-bar supporting the bottom ring 56 from underneath and enabling the bottom ring 56 a degree of independent movement.

Figure 8:
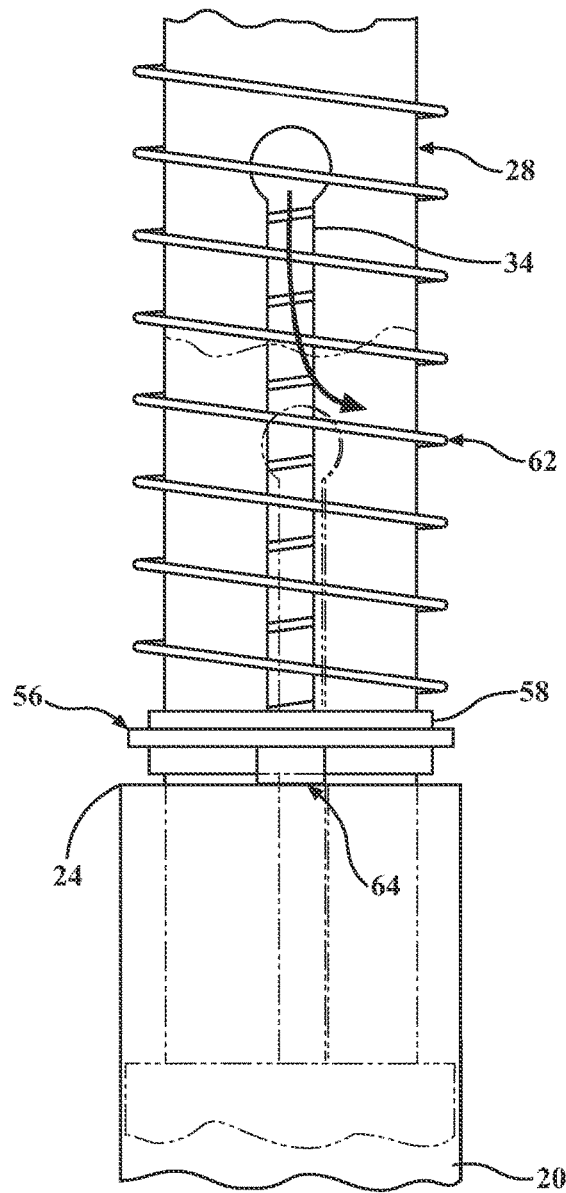
FIG. 8 is a simplified fragmentary view of the bottom ring and loose key features of the present invention as in FIG. 6 and showing in phantom lines with some exaggeration for emphasis the spring barrel rotated sideways upon descent as due to poor manufacturing tolerances or wear under the influence of torsional reactions forces caused by compression of the return spring.
Figure 9:
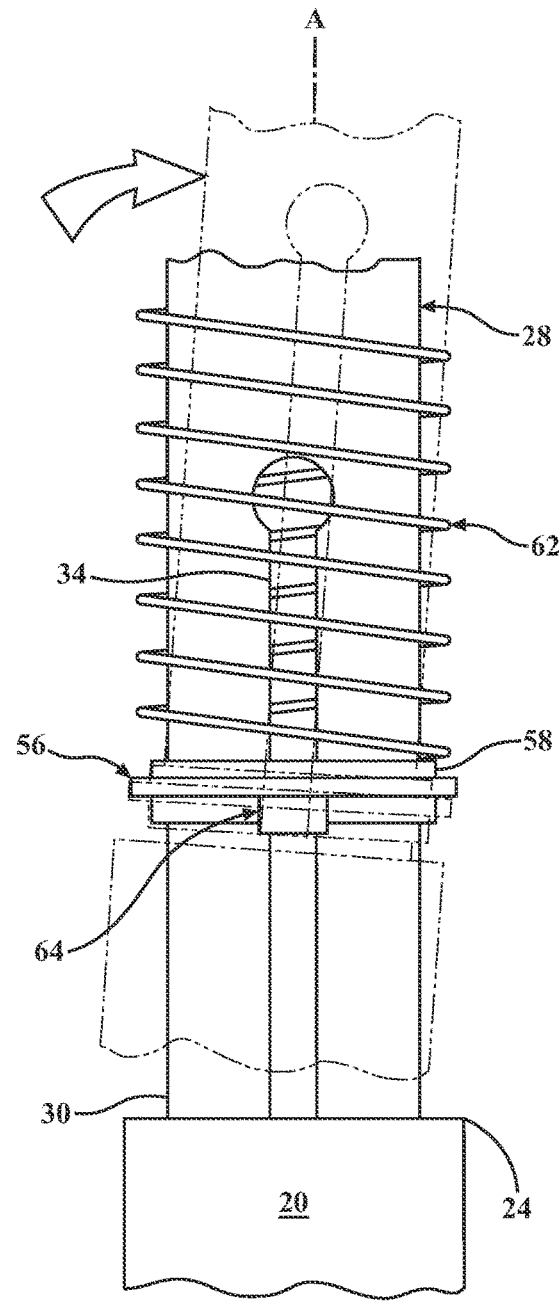
FIG. 9 is a simplified fragmentary view of the bottom ring and key features of the present invention as in FIG. 7 and showing in phantom lines with some exaggeration for emphasis the spring barrel angled upon ascent as due to poor manufacturing tolerances or wear over time.

Such independent movement of the bottom ring 56 relative to the loose key 64 is depicted in somewhat exaggerated fashion in FIGS. 8 and 9. As mentioned earlier, heavy use over time can cause a piston valve 16 to drag, shift, and/or twist during actuation. FIG. 8 is intended to portray an instance where the piston valve 16 shifts rotationally. Those of skill in the art will appreciate the effects of torsion imposed by the coils of the return spring 62 as it is compressed and relaxed, which can impart a rotational influence on the piston valve 16. The illustration of FIG. 8 suggests rotation in a direction that causes the first keyway 34 to shift rightward. However, it will be understood that rotation in the opposite direction could occur, in which case the first keyway 34 would appear to shift leftward from this perspective. FIG. 9 illustrates a piston valve 16 that tips upon actuation, such as is caused by catching or other ill effects of attrition. All of these adverse effects can cause the bottom ring 56 to shift out of position or otherwise bind on the spring barrel 28. Although the shifting is in fact very small, it could have severely negative impact on a player's performance but for the novel accommodation of movement between the loose key 64 and bottom ring 56 enabled by this invention.

Because the loose key 64 is not fixed to (i.e., not integrated with) the bottom ring 56 as in prior art designs, the bottom ring 56 is effectively de-coupled so as to freely move with the shifting, tilting, and/or twisting motion of the externally oriented return spring 62. As a result, the piston valve 16 is less likely to bind during actuation, even when played forcefully over long periods in service. The first 66 and second 68 protruding ends of the loose key 64 will remain seated in their respective sockets 66A, 68B while the notches 60 of the bottom ring 56 execute slight but meaningful shifting/tipping motions relative to their respective perches on the loose key 64. That is to say, the bottom ring 56 can slightly but effectively shift and rock on the loose key 64 perhaps not too unlike the analogy of a person straddling a tree branch who continually shifts as needed to maintain balance.

The present invention can be designed into a musical instrument as original equipment from the manufacturer, i.e., as OEM. The present invention is also useful as a retrofit system, particularly so as to convert a prior art style internal spring valve (FIG. 2) into an external spring type model. As has been mentioned, those most highly skilling in the art are known to prefer external spring type piston valves due to their presumed superior attributes. To undertake a conversion process of this type, a piston valve 16 like that shown in FIG. 2 is removed from its valve casing 18 in the instrument, typically by unscrewing or otherwise removing the keeper 48. With the piston valve 16 removed from the instrument, the valve stem 38 is unscrewed from its connection to the spring barrel 28, enabling the old internal spring to be removed and discarded. Also, the prior art style bottom ring with its monolithic, or otherwise rigidly attached, key is removed from the spring barrel 28 and discarded. This completes the disassembly process.

Referring primarily to FIG. 3, the re-assembly can be described. The loose key 64 is first fitted transversely into the spring barrel 28 with its first 66 and second 68 protruding ends extending through the respective first 34 and second 36 keyways. This maneuver is typically accomplished by initially turning the loose key 64 sideways so that it will freely pass through both keyways 34, 36, and then rotating the loose key 64 into the orientation shown in FIG. 3 once in position. Next, the bottom ring 56 is slid down over the spring barrel 28 so that its notches 60 in the lower cuff straddle the protruding ends 66, 68 of the loose key 64. In the illustrated examples, the width of each notch 60 is equal thus enabling the bottom ring 56 to be installed without concern for orientation vis-à-vis the first 34 and second 36 keyways. The bottom ring 56 thus sets upon the loose key 64 without rigid connection, and rotationally restrained by the interlocking nature of the notches 60.

With the bottom ring 56 in position, the external-type return spring 62 is placed over the spring barrel 28 so that its bottom coil rests upon the spring seat portion of the bottom ring 56, as can be seen in FIGS. 4-9. The length of the return spring 62 is such that, at this stage of the assembly, its uppermost coils will extend above the neck 32 of the spring barrel 28. The top ring 52 is placed atop the return spring 62 so that its uppermost coils are self-centered by the skirt 54. With light pressure, the return spring 62 is compressed until the top ring 52 comes into contact with the neck 32 of the spring barrel 28. While temporarily maintaining the top ring 52 pressed against and centered on the neck 32, the coupling 40 of the valve stem 38 is inserted through the center of the top ring 52 where its threads can engage with the internally threaded neck 32. Rotation of the valve stem 38 thus traps the top ring 52 into position with the return spring 62 partially compressed. This completes the reassembly process of the piston valve 16 now retrofit with an external return spring 62 and professional-grade valve guide components of the present invention.

The retrofit piston valve 16 is re-inserted into the appropriate valve casing 18, rotationally oriented so that the first 66 and second 68 protruding ends of the loose key 64 seat in the corresponding sockets 66A, 68A in the valve casing to enable proper play of the instrument. The keeper 48 is secured to the valve casing 18, and the piston valve 16 is ready for use.

In today's current production of standard piston valve instruments, such as trumpets, the manufacturing and production costs for most popular name brand companies have been lowered to build instruments efficiently and affordably. When it comes to industry standards, the results from lowered costs when building a brass-wind instrument may not include overcoming faulty issues that take place shortly after production. But after a few years of use, these lower-quality parts tend to bind up the action of the piston valve due to adverse rubbing and excessive amounts of wear and tear. Over time, it becomes apparent to accomplished players that instruments made with lower-quality parts can quickly result in a poor instrument performance rating and even a shorter instrument lifetime.

This present invention is a uniquely designed valve guide feature that utilizes specially designed parts used to fit onto the modern-day brass-wind piston valve. Parts subjected to sliding abrasion may be made from thermoplastic that is fabricated using state-of-the-art 3D printing technology. Metallic components may be made of brass with nickel-plate. The return spring 62 may be made of high-carbon steel. A piston valve 16 fitted with valve guide features of the present invention allows for valve action to be smooth, effortless, and yet highly sufficient in all up and down strokes. A piston valve 16 fitted with valve guide features of the present invention eliminates, or at least substantially reduces the risk of, valve catching issues. A piston valve 16 fitted with valve guide features of the present invention will move freely and quietly in both down and up strokes.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A piston valve for a brass-wind musical instrument comprising:
    a generally cylindrical valve body having a top end and a bottom end, said valve body defining a central longitudinal axis along which reciprocating actuation of said piston valve occurs,
    a generally cylindrical spring barrel extending between a base and a neck, said base in direct abutting contact with said top end of said valve body, a first keyway disposed in said spring barrel, a second keyway disposed in said spring barrel diametrically opposite said first keyway, each of said first and second keyways extending from said base axially toward respective terminal ends adjacent said neck,
    a valve stem extending axially from said neck of said spring barrel,
    a bottom ring slidably disposed around said spring barrel, said bottom ring having an annular rim,
    a return spring disposed around said spring barrel, said return spring extending between upper and lower ends, said lower end seated against said annular rim of said bottom ring, and
    a loose key extending transversely through said first and second keyways of said spring barrel, said loose key being in direct contact with and selectively moveable relative to said annular rim of said bottom ring.

2. The piston valve of claim 1, wherein said lower cuff includes a pair of notches disposed diametrically opposite one another.

3. The piston valve of claim 2, wherein said first keyway has a width, each said notch of said lower cuff having a width generally equal to said width of said first keyway.

4. The piston valve of claim 3, wherein said loose key has a first protruding end in registry with said first keyway and a second protruding end in registry with said second keyway, said first and second protruding ends adapted to nest within said notches of said bottom ring.

5. The piston valve of claim 4, wherein said first protruding end has a major T-shaped head.

6. The piston valve of claim 5, wherein said first keyway has a generally constant width, said second keyway having a generally constant width, said width of said second keyway being smaller than said width of said first keyway, said major T-shaped head having a major width greater than said width of said first keyway.

7. The piston valve of claim 4, wherein said second protruding end has minor t-shaped head, said minor t-shaped head having a minor width greater than said width of said second keyway.

8. The piston valve of claim 1, wherein said rim of said bottom ring has an outer rim diameter and an inner rim diameter, said bottom ring including a lower cuff extending downwardly from said rim adjacent said inner rim diameter, said lower cuff set back from said outer rim diameter to form an annular ledge.

9. The piston valve of claim 8, wherein said loose key has an overall length greater than said diameter of said outer rim diameter.

10. The piston valve of claim 1, wherein said valve stem includes a coupling configured to connect to said neck of said spring barrel, a top ring captured between said coupling of said valve stem and said neck of said spring barrel.

11. The piston valve of claim 10, wherein said spring barrel has a barrel diameter, said top ring having an annular upper flange, said upper flange having an outer diameter and an inner diameter, said outer diameter of said upper flange being greater than said barrel diameter, said inner diameter being smaller than said barrel diameter.

12. The piston valve of claim 11, wherein said top ring includes a skirt extending downwardly from said upper flange, said skirt set back from said outer diameter of said upper flange to form an outer relief, said upper end of said return spring seated against said outer relief of said top ring.

13. The piston valve of claim 12, wherein said skirt is set back from said inner diameter of said flange to form an inner relief, said inner relief configured to overlie said neck of said spring barrel and be compressed by said coupling of said valve stem.

14. A guide and return spring conversion kit for the piston valve of a brass-wind musical instrument, said conversion kit comprising:
a top ring having an annular upper flange, said upper flange having an outer diameter and an inner diameter, a skirt extending downwardly from said upper flange, said skirt set back from said outer diameter of said upper flange to form an outer relief, said skirt set back from said inner diameter of said flange to form an inner relief,
a bottom ring having an annular rim, said rim having an outer rim diameter and an inner rim diameter, an upper cuff extending upwardly from said rim adjacent said inner rim diameter, said upper cuff being annular, said upper cuff set back from said outer rim diameter to form an annular spring seat, a lower cuff extending downwardly from said rim (of said bottom ring) adjacent said inner rim diameter, said lower cuff set back from said outer rim diameter to form an annular ledge, said lower cuff including a pair of notches disposed diametrically opposite one another,
a return spring extending between upper and lower ends, said upper end configured to seat against said outer relief of said top ring, said lower end configured to seat against said spring seat of said bottom ring, and
a loose key in direct contact with and selectively moveable relative to said annular rim of said bottom ring.

15. The conversion kit of claim 14, wherein said loose key has a first protruding end and a second protruding end, said first and second protruding ends adapted to nest within said notches of said bottom ring.

16. The conversion kit of claim 14, wherein said loose key having an overall length greater than said diameter of said outer rim diameter.

17. The conversion kit of claim 14, wherein said loose key has a generally rectangular cross-section.

18. The conversion kit of claim 14, wherein said first protruding end has a major T-shaped head, said major T-shaped head having a major width.

19. The conversion kit of claim 18, wherein said second protruding end has a minor t-shaped head, said minor t-shaped head having a minor width less than said major width.

20. A piston valve for a brass-wind musical instrument comprising:
a generally cylindrical valve body having a top end and a bottom end, said valve body having a generally constant body diameter defining a central longitudinal axis along which reciprocating actuation of said piston valve occurs, at least one transversely extending crossport in said valve body for accommodating the passage of air passing though the brass-wind musical instrument,
a generally cylindrical spring barrel extending between a base and a neck, said base in direct abutting contact with said top end of said valve body, said spring barrel having a barrel diameter that is smaller than said body diameter of said valve body, a first keyway disposed in said spring barrel, a second keyway disposed in said spring barrel diametrically opposite said first keyway, each of said first and second keyways extending from said base axially toward respective terminal ends adjacent said neck, said first keyway having a generally constant width, said second keyway having a generally constant width, said width of said second keyway being smaller than said width of said first keyway,
a valve stem extending axially between opposite ends, a coupling at one end of said valve stem configured to connect to said neck of said spring barrel, a finger pad at the other end of said valve stem, a shaft extending axially between said coupling and said finger pad, a keeper slidably disposed on said shaft, a bumper pad disposed on said shaft between said keeper and said coupling,
a top ring captured between said coupling of said valve stem and said neck of said spring barrel, said top ring having an annular upper flange, said upper flange having an outer diameter and an inner diameter, said outer diameter of said upper flange being greater than said barrel diameter, said inner diameter being smaller than said barrel diameter, a skirt extending downwardly from said upper flange, said skirt set back from said outer diameter of said upper flange to form an outer relief, said skirt set back from said inner diameter of said flange to form an inner relief, said inner relief configured to overlie said neck of said spring barrel and be compressed by said coupling of said valve stem, said inner relief having a diameter larger than said barrel diameter,
a bottom ring slidably disposed around said spring barrel, said bottom ring having an annular rim, said rim having an outer rim diameter and an inner rim diameter, an upper cuff extending upwardly from said rim adjacent said inner rim diameter, said upper cuff being annular, said upper cuff set back from said outer rim diameter to form an annular spring seat, a lower cuff extending downwardly from said rim of said bottom ring adjacent said inner rim diameter, said lower cuff set back from said outer rim diameter to form an annular ledge, said lower cuff including a pair of notches disposed diametrically opposite one another, each said notch of said lower cuff having a width generally equal to said width of said first keyway, a return spring disposed around said spring barrel, said return spring extending between upper and lower ends, said upper end seated against said outer relief of said top ring, said lower end seated against said spring seat of said bottom ring, a loose key extending transversely through said first and second keyways of said spring barrel, said loose key being in direct contact with and selectively moveable relative to said annular rim of said bottom ring, said loose key having a first protruding end in registry with said first keyway and a second protruding end in registry with said second keyway, said first and second protruding ends adapted to nest within said notches of said bottom ring.

\* \* \* \* \*